United States Patent Office 3,468,809
Patented Sept. 23, 1969

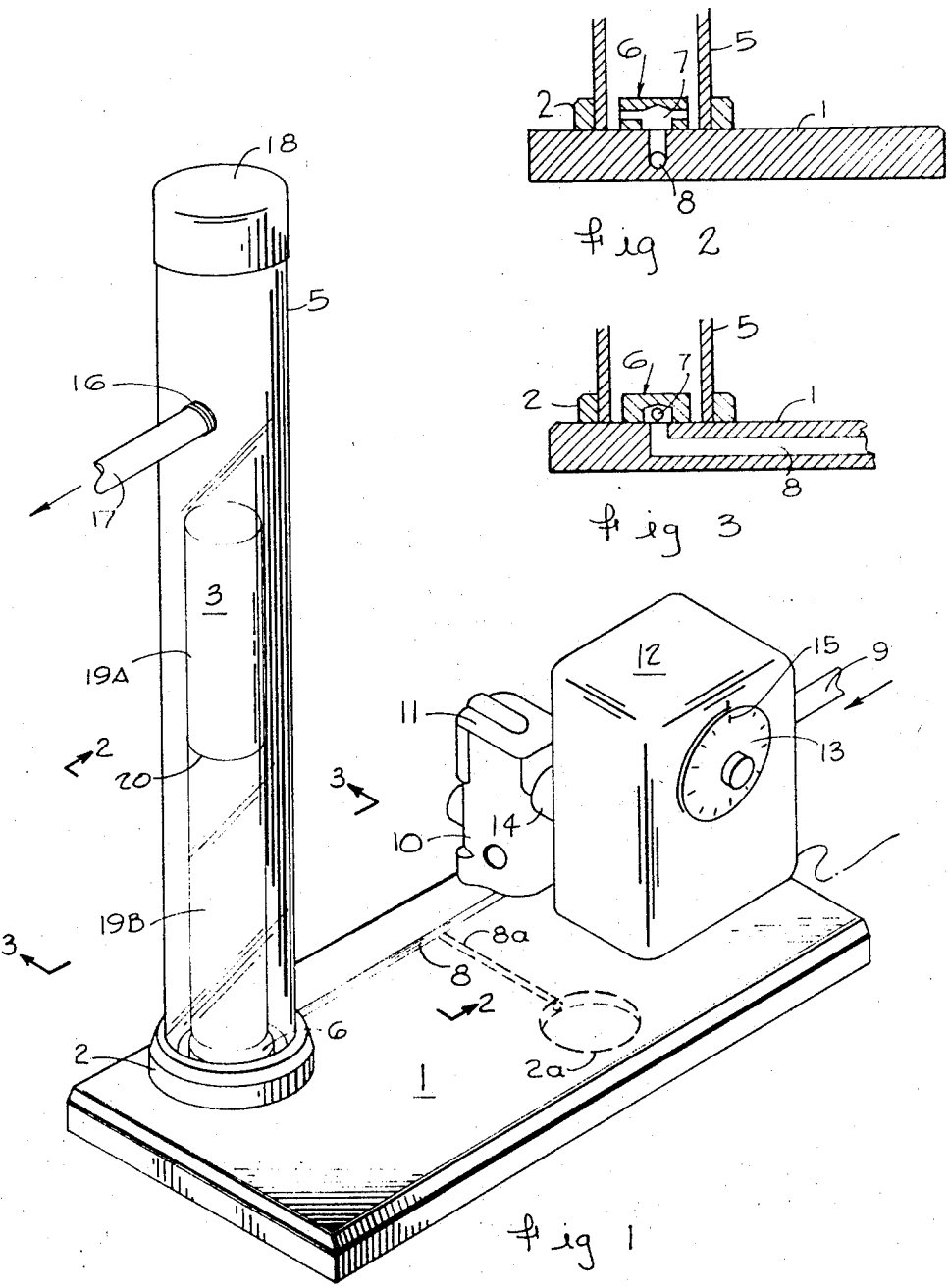

3,468,809
METHOD AND APPARATUS FOR DISSOLVING A SLIGHTLY SOLUBLE SUBSTANCE IN A LIQUID
Leon M. Bloom, Atlanta, Ga., assignor to Bio-Lab, Inc., a corporation of Georgia
Filed Apr. 24, 1967, Ser. No. 633,249
Int. Cl. E03c 1/046; G04c 23/08
U.S. Cl. 137—1                          8 Claims

ABSTRACT OF THE DISCLOSURE

A method and apparatus for maintaining a desired concentration of a slightly soluble substance in a liquid comprises submerging an additive in solid form in a quantity of liquid in an accumulation chamber for an interval of time and thereafter expelling the liquid from the chamber at the end of the time interval and subjecting the additive remaining to a continuous flow of liquid for a subsequent time interval and repeating the steps cyclically.

---

The method and apparatus of this invention as disclosed herein utilizes an accumulation chamber having an inlet and an outlet and into which a liquid is supplied under pressure together with adjustable control means for regulating cyclically the flow of liquid into and out of the accumulation chamber. The chamber is configured and disposed to receive a substance in solid form which is slightly soluble and is adapted to accommodate flow of liquid therethrough and around the solid substance, the liquid being capable of dissolving the solid at a slow and controlled rate. A removable closure cap is associated with the accumulation chamber and is for the purpose of affording access thereto whereby a charge of solid slightly soluble substance may be inserted into the accumulation chamber. The control means as disclosed comprises a time controlled solenoid valve whereby the flow of liquid into the accumulation chamber is regulated by "on" and "off" time intervals which intervals are manually adjustable. Thus when the valve is closed, a fixed volume of liquid is in contact with the soluble solid and when the valve is open a predetermined quantity of liquid is caused to flow by and wash the slightly soluble solid substance.

While the method and apparatus of this invention are not limited to any particular soluble solid substance, the substance disclosed and claimed in U.S. patent application Ser. No. 599,988 filed Nov. 4, 1966 is particularly well adapted for use in conjunction with this invention.

In the chlorination of swimming pools, the degree of chlorine concentration must be regulated within well known predetermined limits if adequate control of algae and bacteria is to be achieved and if the deleterious effects of excessive concentrations of chlorine are to be avoided. While this invention is not limited to chlorination of swimming pools, it is particularly well adapted for this application.

Where swimming pool chlorination is effected by the simple procedure of distributing a chlorine containing powder on the surface of the water, there is no known procedure whereby any accurately measurable control of chlorine concentration may be achieved where solid chlorine bearing compounds are used. Furthermore, apparatus for injecting chlorine in gaseous or liquid form directly into the pool is difficult to control and generally the results achieved thereby are not satisfactory. Where chlorine containing solids are utilized in conjunction with chlorination procedures, it is necessary in order to avoid an excessive concentration of chlorine, to utilize a solid substance which is characterized by a low degree of solubility. Thus when such a substance is used, it is sometimes the practice to introduce a liquid into contact with the solid by a cumbersome system of jet inlets which on the whole has not proved to be entirely satisfactory due primarily to the difficulty of automatically controlling the degree of chlorine concentration.

A principal object of this invention is to provide an improved method of injecting a soluble substance into a liquid whereby a predetermined degree of concentration of the substance is achieved and maintained within predetermined limits.

Still another object of the invention is the provision of an improved apparatus for injecting a soluble substance into a liquid which is both reliable in operation and which is well adapted for ready adjustment for changing service conditions.

Still another object of the invention is to provide an improved chlorinating method and apparatus whereby a high degree of control may be achieved with respect to the chlorine concentration in a reservoir of water.

The invention in one form as applied to a method and apparatus for maintaining a predetermined concentration of a soluble additive in a liquid may comprise the cyclic steps of submerging the additive in solid form in a quantity of the liquid in an accumulation chamber for an initial interval of time, thereafter expelling the liquid and a quantity of additive dissolved therein from the chamber at the end of the interval of time and subsequently subjecting the additive remaining in the receptacle to a continuous flow of liquid through the receptacle for a subsequent interval of time, the time intervals being readily adjustable by manually controllable regulating means.

For a better understanding of the invention reference may be had to the following detailed description taken in conjunction with the accompanying drawing in which FIG. 1 constitutes a perspective showing of one form of apparatus employed in connection with the invention; FIG. 2 is a sectional view taken on line 2—2 in FIG. 1 and in which FIG. 3 is a sectional view taken on line 3—3 in FIG. 1.

With reference to the drawing, the numeral 1 is used to designate a suitable base plate on which the elements comprising the invention are mounted. Base plate 1 may constitute any suitable material but preferably is of a strong plastic or like material. Affixed to base plate 1 is a circular ring structure 2 which surrounds and secures an upright hollow tubular element 5 in position which element defines the sides of an accumulation chamber 3 formed therein. Tubular element 5 is provided with a baffle element 6 affixed by any suitable means to the upper surface of base plate 1. As shown in FIG. 1 of the drawing, the tubular element 5 is constructed of clear plastic whereby element 6 is readily observable from outside the tubular element 5.

For the purpose of supplying liquid to the accumulation chamber 3 inside the tubular element 5, an inlet passage 8 is formed in base plate 1 and is arranged to communicate with the interior cavity 7 of baffle element 6. While passage 8 is shown as being formed in base plate 1, it will be understood that it could comprise a separate conduit above the base plate and connected with the side of element 5. In order to obtain a satisfactory dissolving rate it is necessary that the inlet and outlet be so located that there is a flow of liquid along the sides of the stick. Liquid is supplied to inlet passage 8 by way of conduit 9 and control valve 10 which is of conventional construction. Control valve 10 is opened and closed by a suitable conventional solenoid 11 which in turn is controlled by a conventional timer 12 having a manually adjustable dial 13. As is well known, control of solenoid 11 is by way of a suitable electronic conduit 14 which interconnects timer 12 and the solenoid 11. Of course electric power is supplied by conventional conductor means not shown.

Thus with dial 13 set at some predetermined position along the conventional indicia 15, the valve 10 is held closed for a predetermined period of time following which valve 10 is automatically opened by solenoid 11 for a succeeding interval of time. At the end of the open period, the 'closed-opened" cycle is repeated continuously.

Liquid from accumulation chamber 3 is exhausted from that chamber through outlet 16 formed in the tubular element 5 at a point remote from the accumulation chamber inlet adjacent the baffle element 6. Of course a conduit such as 17 is associated with outlet 16 and serves to supply the exhausted liquid to any suitable point of use such for example as a swimming pool. Of course, if the apparatus is used in connection with chlorination of a swimming pool, the conduit 9 is interconnected with the pool and its associated pumping apparatus so that liquid is drawn from the pool through the conduit 9, valve 10, conduit 8, through the cavity 7 in baffle 6 into the accumulation chamber 3 out through the outlet 16 and the conduit 17 and back into the swimming pool.

A soluble substance in solid form is placed in the accumulation chamber 3 through the upper end of tubular element 5, the removable closure cap 18 preferably being threadedly associated with the upper end of tubular element 5. Thus with the removable closure cap 18 removed, a solid material, preferably in the form of a tubular or elongated configuration is inserted into the accumulation chamber 3 and the cap 18 thereafter is screwed into closed position. Of course the size and configuration of the elongated soluble substance is such that liquid is disposed about the exterior of the solid stick and along the inner surface of the walls of the accumulation chamber 3. Of course the solid stick of additive substance may constitute two or more elements such as 19A and 19B, the junction between the adjacent ends of these elements being indicated by the numeral 20. Of course still another element such as 19A or 19B may be added atop the element 19A if desired. By suitable choice of the number of elements 19A and 19B which are disposed within the accumulation chamber 3, a predetermined measure of control of the concentration of liquid is established.

From the description thus far, it is apparent that liquid drawn in through the conduit 9 is treated with the soluble additive 19A, 19B and is subsequently exhausted through the conduit 17. Furthermore, during the portion of the operating cycle when the valve 10 is closed, the accumulation chamber 3 is filled with liquid which may result in the concentration of the solid in the liquid increasing to a point approaching the theoretical maximum concentration. This depends upon the degree of solubility of the solid and the time interval that the valve is closed. Following the termination of the valve closed time interval, the valve 10 is opened during which time liquid through conduit 9, valve 10, and conduit 8 is passed continuously through cavity 7, accumulation chamber 3, and out through outlet 16 and conduit 17. During this latter time interval, the solid additive 19A, and 19B is constantly washed and dissolved along the exterior thereof by the liquid. Of course the degree of concentration of additive in chamber 3 during the time interval when valve 10 is open is not nearly as high as is the concentration at the end of the closed period of valve 10. Constant movement of liquid through the accumulation chamber 3 while valve 10 is open however results in a substantial overall addition of additive to the liquid. Thus in order to adjust the concentration of additive in the pool, it is simply necessary to adjust dial 13. To increase the concentration of chlorine in the pool, it is necessary to increase the open time of the valve. In practice it is possible by experience to determine empirically the settings which are desirable for dial 13 for varying conditions of use. For example, if the device is used in connection with the chlorination of a swimming pool and if the pool is subjected to extensive usage, the setting for dial 13 is chosen so that valve 10 is held open for a considerably longer period of time relative to the closed period thereof than when the pool is subjected to limited use by a few persons over extended intervals of time.

Where it is desired to increase the capacity of the system of this invention, one or more additional chambers 3 may be provided and connected in parallel to the conduit 8 as schematically indicated at 8a and 2a.

The embodiments of the invention in which an exclusive property or privilege is claimed are defined as follows.

I claim:

1. A method of maintaining a predetermined concentration of a slightly soluble additive in a liquid comprising the cyclic steps of submerging the additive in solid form in a quantity of the liquid in an accumulation chamber for an initial interval of time, expelling the liquid and a quantity of additive dissolved therein from the chamber at the end of the initial time interval, and thereafter subjecting the additive remaining in the chamber to a continuous flow of the liquid through the chamber for a subsequent interval of time following which the cycle is repeated on a continuous basis.

2. The method defined in claim 1 wherein the duration of each time interval is controllable relative to the other time interval so as to control the degree of concentration of the additive in the liquid.

3. The method of claim 1 wherein the degree of concentration of the additive in the liquid is dependent upon and varies with variations in the magnitude of said subsequent time interval.

4. The method defined in claim 1 wherein the liquid and additive comprise an aqueous chlorine solution.

5. Apparatus for injecting a solid soluble substance into a liquid comprising an accumulation chamber having an inlet and an outlet, means for supplying liquid through said inlet to said chamber under pressure, and control means for regulating the flow of liquid through said chamber, said chamber being configured and arranged to receive a quantity of the soluble substance in solid form while accommodating flow of liquid therethrough and said control means being cyclically operable so as to cause continuous flow of liquid through said chamber for a portion of an operating cycle and so as to maintain a static quantity of liquid in said chamber for the remaining portion of the operating cycle.

6. Apparatus according to claim 5 wherein said control means comprises a time controlled solenoid valve arranged to remain alternately open and closed for adjustable time intervals.

7. Apparatus for injecting a solid soluble substance into a liquid comprising an accumulation chamber having an inlet and an outlet, means for supplying liquid through said inlet to said chamber under pressure, and control means for regulating the flow of liquid through said chamber, said chamber being configured and arranged to receive a quantity of the soluble substance in solid form while accommodating flow of liquid therethrough and said control means comprising a time controlled solenoid valve arranged to remain alternately open and closed for adjustable time intervals.

8. Apparatus for injecting a solid soluble substance into a liquid comprising an accumulation chamber having an inlet and an outlet, means for supplying liquid through said inlet to said chamber under pressure, and control means for regulating the flow of liquid through said chamber, said chamber being configured and arranged to receive a quantity of the soluble substance in solid form while accommodating flow of liquid therethrough, said chamber being of hollow elongated tubular configuration, and a baffle element disposed in said chamber, said baffle element comprising a wafer element disposed concentrically in said chamber adjacent said inlet and astride the path of flow of incoming liquid, said wafer having formed therein an inlet and connecting radially arranged flow passages for directing incoming liquid outwardly toward the chamber walls.

References Cited

UNITED STATES PATENTS

| 2,553,977 | 5/1951 | Mav | 137—268 XR |
| 2,660,560 | 11/1953 | Pickard | 137—1 |
| 2,965,125 | 12/1960 | Osborne et al. | 137—268 |

M. CARY NELSON, Primary Examiner

R. J. MILLER, Assistant Examiner

U.S. Cl. X.R.

137—268, 624.15